United States Patent [19]

Randolph

[11] Patent Number: 5,657,222

[45] Date of Patent: Aug. 12, 1997

[54] REVENUE SHARING SYSTEM WITH DATA CAPTURE FROM VIDEO BUFFER

[75] Inventor: David George Randolph, Plano, Tex.

[73] Assignee: Supercomm, Inc., Dallas, Tex.

[21] Appl. No.: 953,548

[22] Filed: Sep. 29, 1992

[51] Int. Cl.[6] .................................................. G06F 17/60
[52] U.S. Cl. ......................................... 395/221; 395/230
[58] Field of Search ................................. 364/402, 404,
364/405, 408, 406, 401, 403; 380/3, 4

[56] References Cited

U.S. PATENT DOCUMENTS

| | | |
|---|---|---|
| 3,702,989 | 11/1972 | Provenzano et al. . |
| 3,973,244 | 8/1976 | Lovercheck et al. . |
| 4,183,086 | 1/1980 | Kober . |
| 4,530,051 | 7/1985 | Johnson et al. . |
| 4,725,949 | 2/1988 | Dreher ............................ 364/405 |
| 4,972,504 | 11/1990 | Daniel, Jr. et al. ................ 364/403 |
| 5,023,782 | 6/1991 | Lutz et al. ........................ 364/405 |
| 5,189,607 | 2/1993 | Shirasaki et al. ................. 364/405 |
| 5,331,544 | 7/1994 | Lu et al. .......................... 364/401 |
| 5,337,253 | 8/1994 | Berkovsky et al. ............... 364/403 |
| 5,396,417 | 3/1995 | Burks et al. ..................... 364/401 |

*Primary Examiner*—Robert A. Weinhardt
*Attorney, Agent, or Firm*—Gregory M. Howison

[57] ABSTRACT

A method for extracting revenue information from a Point of Sale terminal for purposes of revenue sharing includes the step of examining data traffic in a conventional Point of Sale operating system. This operates in the background and allows extraction of select data relating to revenue traffic in a rental system. Data stored in a video buffer (54) is examined and, upon a predetermined transaction completion event then occurring, this data is extracted and stored in a separate capture file. This capture file is utilized to generate a revenue sharing data base, which is transferred to a remote revenue sharing transaction system. The transaction completion event is a keystroke that indicates completion of a transaction at the Point of Sale terminal.

11 Claims, 4 Drawing Sheets

REVENUE SHARING SYSTEM WITH DATA CAPTURE FROM VIDEO BUFFER

TECHNICAL FIELD OF THE INVENTION

The present invention pertains in general to revenue sharing systems, and more particularly, to a revenue sharing system that operates in parallel with a Point of Sale terminal.

BACKGROUND OF THE INVENTION

Point of Sale terminals have typically been utilized to maintain a real-time running status of inventory, sales activity and price changes. However, in recent years, these Point of Sale terminals have also been utilized to track information regarding revenue sharing aspects of certain merchandise in which more than one party has an interest.

One example of a revenue sharing scheme is that involved with respect to the renting of home Videos. In the home video renting market, a vendor purchases from a supplier videotapes for select programs which he then rents. When the videotapes are received, the vendor places a bar code on the videos, codes this bar code into his system, and then places it on a shelf. When a customer rents the video, the bar code on the video is scanned, and the status of the video altered within the local database to indicate that it has been rented. When it is returned, it is then scanned again to place it back into the rent inventory. The system provides a vendor with knowledge of the number of tapes that are in his rent inventory, the number of tapes that are rented and the number of tapes that are overdue and the individuals that have these tapes. This allows the vendor to assess the type of traffic that he has with respect to particular videos, etc.

In conventional marketing schemes with respect to video rentals, the vendor must incur considerable expense in renting particular videos. For example, the cost of the video may be as much as twenty times the single rental rate for the video. If a video rents for $3.00, the purchase price might be as high as $60.00. Therefore, the vendor must rent the video a minimum of twenty times to break even. Of course, with a very popular program, the vendor can rent this well over one hundred times, if not more. The problem exists with respect to a program that may have very poor reception in the public once the video has been placed on the shelf and into the rent inventory. Unfortunately, the vendor cannot assess the public's reception of the program until it is on the shelf. As such, the vendor may have incurred significant costs and is therefore reluctant to place significant investments into the actual purchase of tapes to place into the rent inventory. Of course, the popularity of a given program is relatively short and it is difficult to order additional videotapes to meet a given demand, as this demand can drop off very rapidly.

With revenue sharing schemes, the supplier can provide to the vendor tapes at a much reduced cost, since the actual production costs of the videotape is relatively low compared to the wholesale cost. Vendors can therefore place more videotapes into their rent inventories and the suppliers can insure that the maximum number of videotapes for a popular program are in the rent inventory.

A disadvantage to revenue sharing systems is that it is difficult for a supplier that has an interest in the revenue sharing to monitor traffic at a vendor to insure that they are getting their proper portion of the revenue. Additionally, most vendors have a standard Point of Sale terminal that "locks" them in to a given system which may not be compatible with different suppliers. The reason for this is that different suppliers use different bar codes or coding techniques, different serial numbers, etc. than would a vendor. This situation is further exacerbated by the fact that most Point of Sale terminals cannot accommodate a revenue sharing scheme without significantly rewriting the software and providing communications. One solution to this problem has been to provide an intercept box that is disposed between the Point of Sale terminal and the printer to intercept information that is transferred to the printer. By examining the fields, in the print output information can be gleaned as to what transactions have occurred. This information then can be converted into a second database and stored locally or transferred to a remote location. However, this system requires completely separate hardware and is subject to whether a printout has been ordered for a given transaction.

SUMMARY OF THE INVENTION

The present invention disclosed and claimed herein comprises a revenue sharing Point of Sale system. The revenue sharing system includes a primary Point of Sale system and a background revenue sharing system. The primary Point of Sale system is comprised of an input device operable to receive the transaction input information regarding a revenue transaction. A processor is operable to receive the transaction input information and process this information in accordance with a Point of Sale operating program. The processor generates revenue transaction data and stores this revenue data in a main storage device upon the occurrence of a predetermined transaction completion event. The processor, input device and storage device are interconnected with a data traffic device to allow data flow therebetween. The backup revenue sharing system includes a transaction detection device for detecting the occurrence of the transaction completion event. The data capture device is operable to monitor the data traffic on the data traffic device to detect predetermined transaction data generated by the processor and transferred thereto. The predetermined transaction data is captured upon detection of the occurrence of the transaction completion event. This captured transaction data is stored in a secondary storage device.

In another aspect of the present invention, a display is provided for displaying the revenue transaction data generated by the processor in a predetermined video format. The predetermined video format is stored in a video data buffer that is interfaced with the data traffic device. The predetermined format is determined in the video buffer such that the desired revenue transaction data monitored by the data capture device is stored at predetermined locations within the video buffer. The data capture device therefore monitors the predetermined locations and outputs them for storage in a secondary storage device upon detection of the occurrence of the transaction completion event.

In yet another aspect of the present invention, a keyboard is provided for inputting the data in the form of keystrokes to the processor through the data traffic device. The transaction detection device is operable to detect the keystrokes, wherein the transaction completion event is comprised of a predetermined keystroke.

In a further aspect of the present invention, a communication device is provided for interfacing with the secondary storage device. The communication device is operable to access the secondary storage device to transfer the stored revenue transaction data to a remote location.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
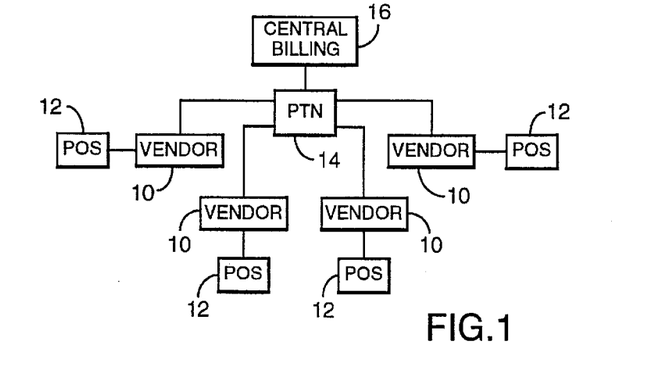
FIG. 1 illustrates an overall block diagram of the distribution of the vendors routed to the central billing station.

Referring now to FIG. 1, there is illustrated an overall block diagram of a centralized revenue sharing system. The revenue sharing system utilizes a plurality of remotely disposed vendors 10, each having a Point of Sale (POS) terminal 12 disposed thereat. Each of the vendors 10 has associated therewith a rental inventory with the POS terminal 12 operable to log transactions into and out of the rental inventory. The revenue associated with this transfer out of the rental inventor is transferred from each of the vendors 10 through a Public Telephone Network (PTN) 14 to a central billing station 16. The central billing station 16 is primarily concerned with the revenue sharing aspect and not the overall profit or inventory of the vendor. As will be described hereinbelow, this is a background operation to the general operation of the POS terminal 12 at each of the vendors 10. Further, each of the POS terminals 12 can be different and each can have a separate coding system for managing their own inventory.

Figure 2:
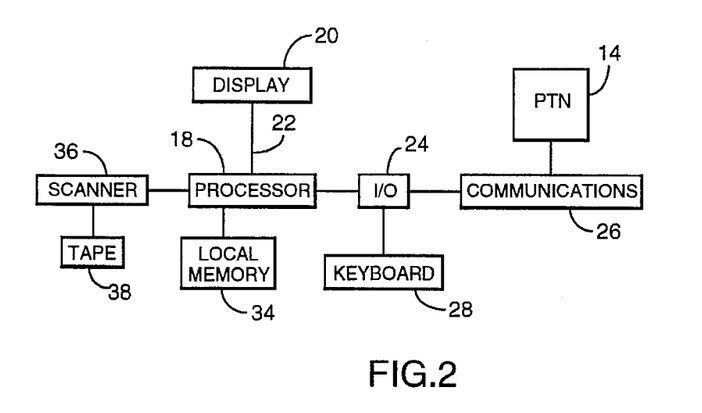
FIG. 2 illustrates a block diagram of the Point of Sale terminal at each of the vendors.

Referring now to FIG. 2, there is illustrated a block diagram of the POS terminal 12. The POS terminal 12 is comprised of a processor unit 18 at the center thereof which can be a personal computer or a similar type processor. The processor 18 has associated therewith a display 20 that is connected thereto through a cabling system 22. The processor interfaces through an I/O device 24 with a communications device 26 such as a modem, which is connected through the PTN 14. The I/O circuit device 24 is also connected to a keyboard 28 to allow input of information thereto. The keyboard 28 is typically connected to a keyboard cable 30. The processor 18 is operable to store information in a local memory 34 for use in both storing data and storing program instructions. The processor 18, in addition to receiving instructions from the keyboard 28, also receives information from a bar code scanner 36. The bar code scanner 36 is operable to scan information from a tape 38, the tape 38 being a videotape that is a portion of the rental inventory. Whenever a tape 38 is removed from the rental inventory, it is scanned by the scanner 36 and utilized in conjunction with an operating program to manipulate the inventory. Typically, the operating software pulls up a predefined video display for output on the display 20 with multiple fields. The user merely utilizes the keyboard 28 to input the various information into the fields. This information is, for example, billing information, the customer's address, the tape ID, etc. Once this information is input, the operator logs this information into the database and this constitutes a transaction. Thereafter, the tape 38 is removed from the rental inventory and billed to the customer, this constituting a revenue sharing event; that is, the parties in the revenue sharing arrangement all receive credit for a portion of the rental fee for that tape 38. This can also be output to a printer (not shown) through the I/O device 24 and also stored in the local memory.

In accordance with the present invention, the revenue sharing portion of the operating program, this being a background operation, will extract the revenue sharing information and transfer it through the communications device 26 and the PTN 14 to the central billing station 16. The important aspect of the revenue sharing transaction is that each time a tape has been moved out of the rental inventory and rental income received therefore, this information is transferred as a revenue sharing transaction to the central billing station 14. Alternatively, this information could be stored at the local memory 14 and retrieved at a later time. In any event, the revenue sharing information reflects an accurate record of all transactions, which information includes the tape rented, the amount it was rented for, and the time it was rented. Further, when tapes are returned to the rental inventory, this information is also logged in and made part of the revenue sharing record.

Figure 3:
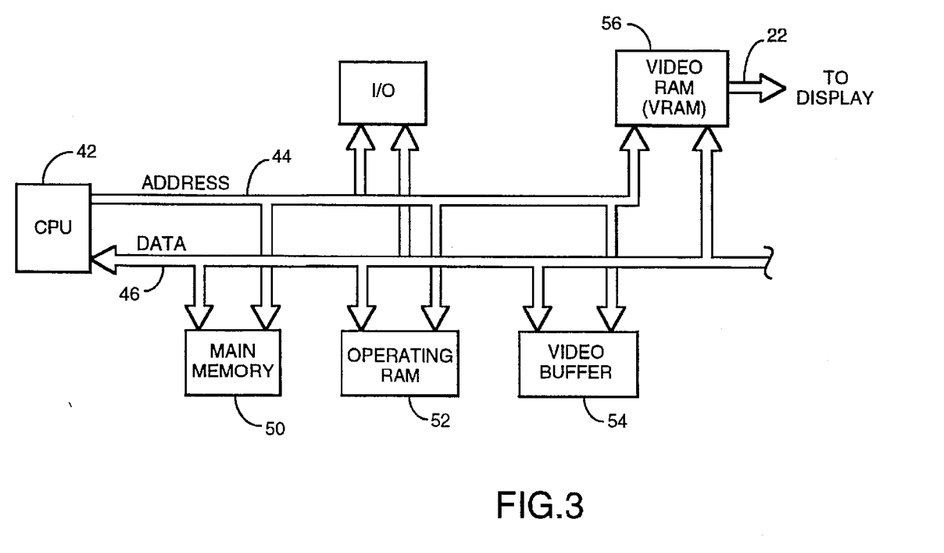
FIG. 3 illustrates a detailed block diagram of the processor.

Referring now to FIG. 3, there is illustrated a more detailed block diagram of the processor illustrating the video buffering operation and the capturing operation utilized in accordance with the revenue sharing system of the present invention. The processor 18 has disposed thereat a Central Processing Unit (CPU) 42 which can be any type of microprocessor-based system that is operable to execute instructions through generating addresses for output on an address bus 44 and interfacing with data on a data bus 46. The data bus 46 and address bus 44 interface with a main memory 50, which main memory is generally comprised of a combination of Random Access Memory (RAM) and non-volatile virtual memory, such as a hard disk or similar structure. The main memory 50 is operable to provide permanent storage for data and the such. Instructions then are carried out by the CPU 42 are generally retrieved from the main memory 50, such as program instructions, and temporarily stored in an operating RAM 52 which interfaces with the address bus 44 and data bus 46. Additionally, a video buffer 54 is provided for storing information relating to video operations. The video buffer 54 interfaces with the address bus 44 and data bus 46. Typically, the display interfaces through a Video RAM 56 (VRAM), which is operable to buffer video data for output to display 20. This is a conventional operation.

In general, the CPU 42 operates in accordance with an Intel® architecture to allocate 640K of RAM to the operating system. Of this memory, a portion is allocated toward various buffers such as the video buffer 54, keyboard buffer, interrupts, etc. In general, the video buffer 54 always occupies the same area of the memory and has a defined address region. This is defined by the given architecture. Of course, for a different architecture, the video buffer will be disposed at a different place in memory. In this manner, the operating system can interface with the video buffer 54 in order to allow the buffer to be updated and data to be extracted therefrom for output to the display 20.

Figure 3A:
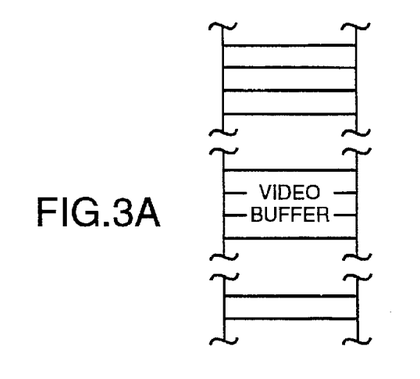
FIG. 3a illustrates a diagrammatic view of the video buffer.

In general, the display is configured of a plurality of pixels, which pixels are arranged in rows and columns. The display is operable to scan a given row and output pixels in a serial manner. The video buffer 54 is typically "pixel mapped" such that the data is arranged in the video buffer 54 in the same manner that it is extracted. FIG. 3a illustrates the address space for the video buffer, where it can be seen that incrementing an address pointer results in digital words being output, each digital word representing a portion of the serial data. It is only necessary to increment through this address space in order to assemble the sequential data stream that is necessary to update the, display on a given scan. Of course, each repeat of the scan results in a repeat of data being output from the video buffer 54.

In accordance with the present invention, the preferred embodiment utilizes a video capture scheme. In order to interface with the outside world, any operating program utilized in a POS terminal requires the data to be displayed or be transferred from the operating RAM 52 to the main memory 50 for storage therein. This requires data traffic. The data traffic can either be of the type utilized for the video buffer 54, it can be keyboard data which is also buffered in a separate portion of the address space, or it could be any type of data traffic on the data bus 46. Although any of the data could be captured and examined during traversal of the data bus 46, the preferred embodiment utilizes video capture. This is achievable since the video display will display all fields of interest for a given transaction. This, as will be described hereinbelow, is utilized in conjunction with certain keystrokes that define the termination of a transaction, i.e., a keystroke that is associated with entering the transaction into the memory. When this keystroke occurs, the field is captured. However, it should be understood that any type of capture scheme that allows data traffic to be examined on the data bus 46 and extracted to define the transaction could be utilized.

Figure 4:
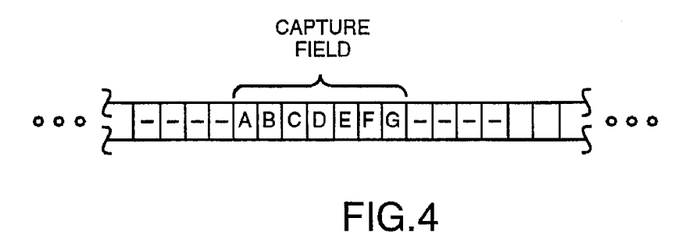
FIG. 4 illustrates a diagrammatic view of a capture field within the video buffer.

Referring now to FIG. 4, there is illustrated a diagrammatic view of the video capture scheme. As described above, the data is arranged in a serial format for outputting pixels in a given line. Therefore, a predetermined portion of the address database will be associated with a given field. It is only necessary to know the location of the field for the data associated with the pixel in that field within the address base in order to extract this information from the video buffer 54. Additionally, it is necessary to know at which time in the transaction that the data must be extracted. Which extraction indicates the completion of a transaction. This is done through recognition of a given keystroke, this given keystroke being associated with a given Point of Sale operating system.

In order to the application to work, a unique tape ID is required for each tape that is transferred to and from the rental inventory. The tape ID is a unique identifier for this particular tape and this title. In order to track the actual movement of the tapes into and out of the rental inventory, each of the tapes will have a unique identifier. The present background system determines what this identifier is. On some systems, this is relatively easy, as there is only one ID associated with each tape. However, in other systems, this is not as straightforward, since some systems utilize multiple IDs, such as one that utilizes a title number, a volume ID and a UPC code. In this system, the actual volume ID would be the actual tape ID. It is therefore necessary to discriminate this and make this part of the system. Additionally, it is necessary to determine when revenue is created. In some systems, revenue is created upon rental of a tape. On other systems, revenue is realized when the tape is returned back to the rental inventory. Therefore, the critical actions that define tape revenue capture would be "tape add", "tape delete", "tape rental" and "tape return". On each of these aspects, a number of things need to be identified, which are as follows:

a. At what point has the application committed to performing the action? In a large number of instances, an application has all the information that is needed on the screen, but it is not certain that the application data files are changed until some specific action occurs. It is necessary to identify the action. For example, on several applications, the "acid tape" function cannot be counted on until after the application has attempted to add the tape and not gotten an error message. The capture program would be required to hold the program until the error message point has passed and then the information can be saved.

b. Does the screen contain all the information necessary? For all "tape adds", "tape rentals" and "tape returns" it would be desirable to have the tape ID, the tape name and any amounts associated with the tape. By way of example, on a late tape, if a tape is returned without paying the late fee, the question would be whether the late fee was properly associated with this tape on the subsequent rental. This is important information for the revenue sharing process.

c. Identify the positions and contents for capture. The video capture routine identifies the actual positions on the screen at the moment of capture. However, this tape capture routine does not execute unless the system is expecting input, in order that momentary messages cannot be captured or examined by the tape capture program.

d. Determine how to trigger off of the capture point. The tape capture routine provides for several method of triggering off of a given action point. The first method is to watch for the request from the application for data entry into a specific field on the screen. The trigger point may be either the point at which the application first puts the cursor in that field for data entry or the trigger point may be when the data entry is finished. Another method is to examine the values entered into a specific field and when the field is holding one of possible several specific values to trigger the capture. Another method is to watch for specific "function keys" when one of those keys is pressed and certain points on the screen/hold specific values, then trigger the capture action.

In the preferred embodiment, the video capture routine is a conventional software program marketed under the name "VIA", which is marketed by Portable Computing Systems, Inc., a Dallas, Tex. corporation. This is readily available, and is utilized to capture any information from the video buffer at a given location or field on the display screen. This information can then be transferred to a different area in memory and buffered for later use.

Figure 5:
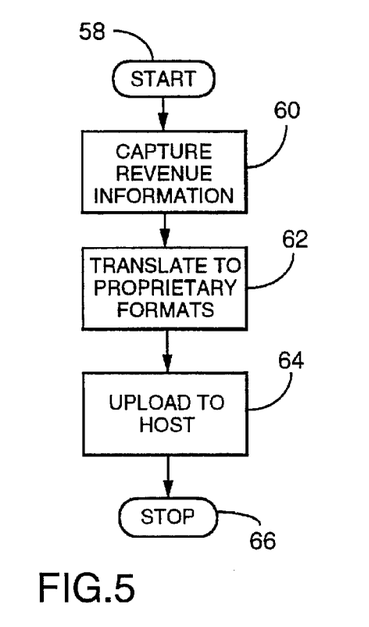
FIG. 5 illustrates a flowchart for the overall processor flow of the revenue sharing system.

Referring now to FIG. 5, there is illustrated a flowchart depicting the overall process flow for the revenue sharing system. The program is initiated at a start block 58 and then proceeds to a function block 62 in order to transfer the revenue information that was captured to a proprietary format, which proprietary format is utilized at the billing station. This information is then uploaded to the host, as indicated by function block 64, and then the program flows to a stop block 66.

Figure 6:
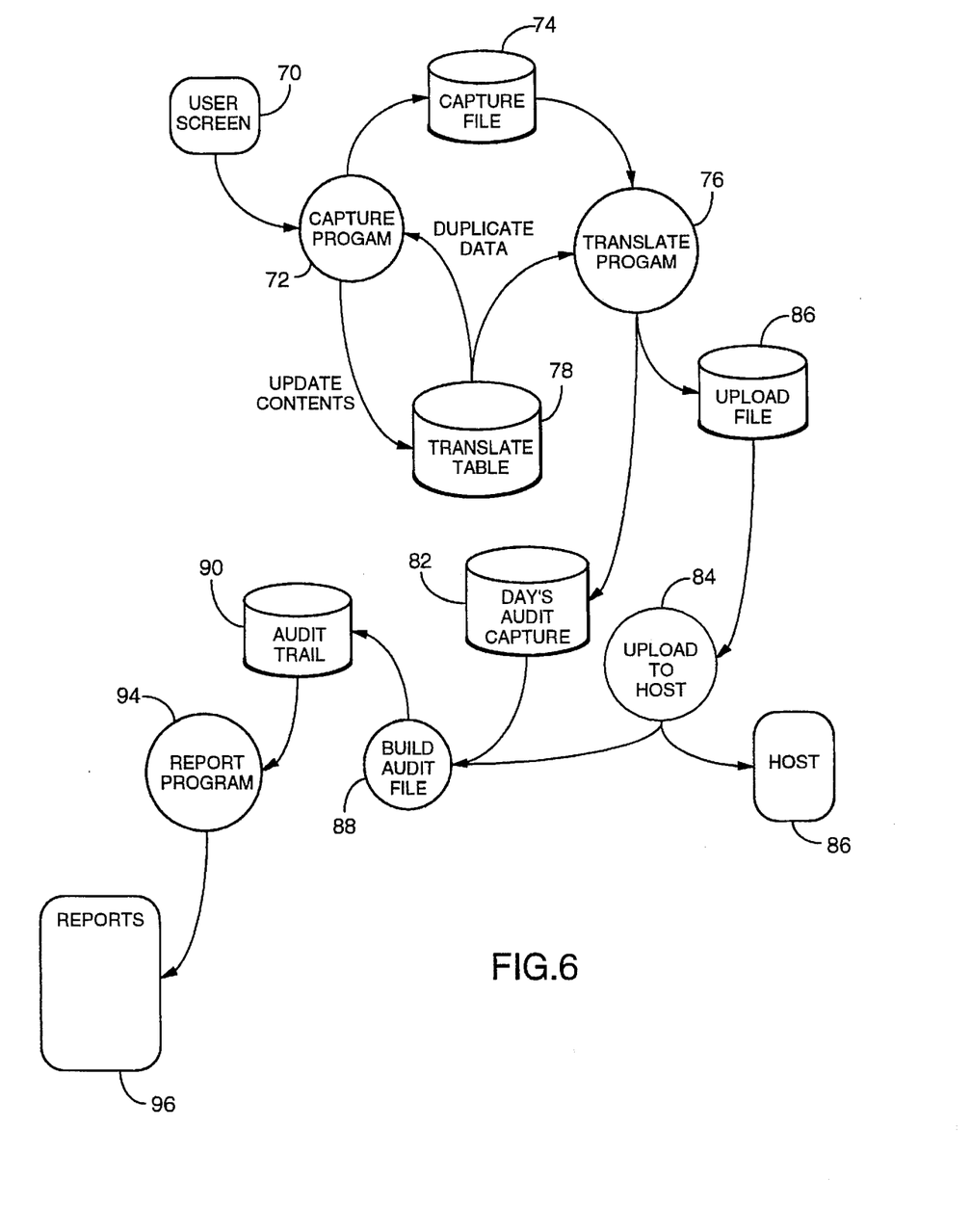
FIG. 6 illustrates a flowchart of the capture system.

Referring now to FIG. 6, there is illustrated a flowchart for the overall capture system. The user screen is the start point for the program, as represented by an input block 70. The user screen generally represents the video buffer 54. The capture program is processed, as indicated by an operating block 72, which is operable to capture data from the screen 70. The capture program inputs the updated contents of the screen to a capture file, indicated by a storage block 74, which capture file is utilized by the translate program, indicated by an operating block 76. The capture program 72 is operable to interface with a translate table, the translate table providing a table of IDs of the tapes that are associated with the IDs that the vendor utilizes. In order to generate this translate table, as indicated by storage block 78, upon inputting the tapes to the rental inventory, a program is provided that automatically requires input of the ID associated with the revenue sharing process. Therefore, a Point of Sale system that has one ID format can have associated therewith a second ID, such that whenever one of the vendor's IDs comes up, a corresponding ID can be looked up in the translate table 78 and input to the translate program 76. The translate program block 76 is operable to translate the data in the captured file 74 and then transfer this to an upload file, as represented by storage block 80. Additionally, the translate program 76 is operable to transfer the translated data to an audit capture file that is updated on a daily basis, this indicated by a storage block 82. The information stored in the upload file, as indicated by the storage block 80, is accessed by an operating block 84 to upload this data to the host. This is indicated by a box 86. Additionally, this upload data is utilized by an audit file routine indicated by an operating block 88 to build an audit file, which information is stored in an audit trail file, as indicated by a storage block 90. The audit file routine, indicated by the operating block 88 also utilizes the information stored in the audit capture file for a given day, as indicated by the storage block 82. The audit trail information as stored in the storage block 90, is utilized in a report program, as indicated by an operating program 94 to generate reports, as indicated by an output block 96.

Figure 7:
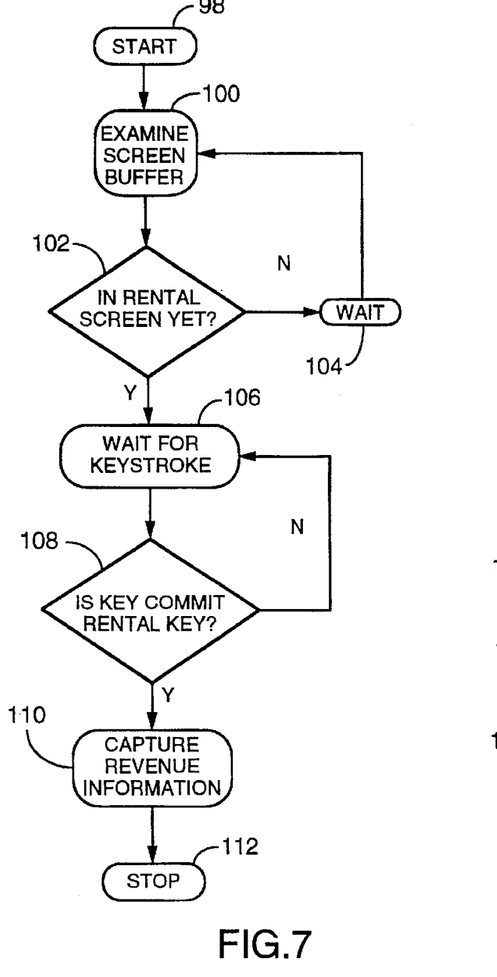
FIG. 7 illustrates a flowchart for the rental capture point.

Referring now to FIG. 7, there is illustrated a flowchart depicting the operation of the method for determining the rental capture point. The program is initiated at a start block 98 and then proceeds to a function block 100 to examine the video screen buffer 54. The program then flows to a decision block 102 to determine whether the information is within the appropriate field in the video buffer 54. If not, the program flows along a "N" path to a function block 104 to wait and then back to function block 100. This continues until the desired information is within the video buffer 54. When this occurs, the program flows along a "Y" path from a decision block 102 to a function block 106 to wait for a predetermined keystroke. The program then flows to a decision block 108 to determine whether a given keystroke is the "Commit Rental" key. If not, the program flows back to the function block 106 to wait for the next keystroke. This continues until the Commit Rental key is depressed. When the key depressed is the Commit Rental key, the program flows along a "Y" path from the decision block 108 to a function block 110 to capture the revenue information and then to a stop block 112.

Figure 8:
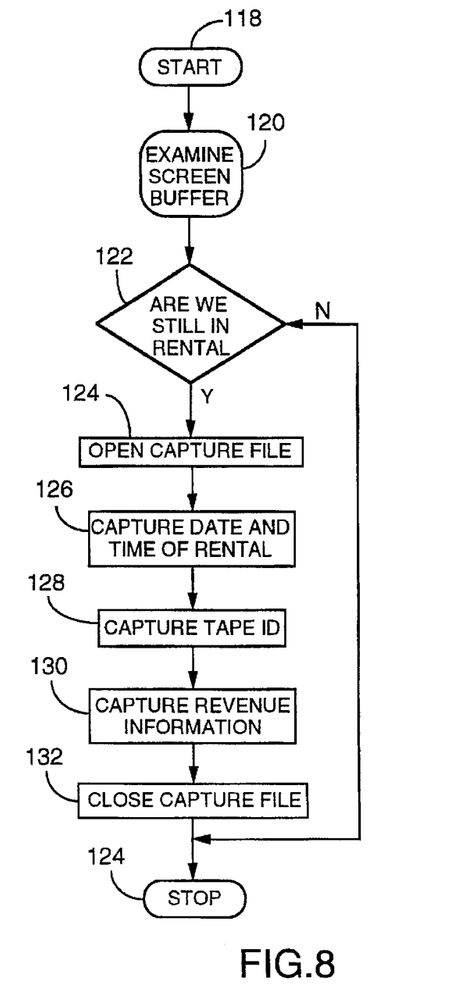
FIG. 8 illustrates a flowchart for the operation of capturing the revenue information.

Referring now to FIG. 8, there is illustrated a flowchart depicting the operation for capturing the rental information. The program is initiated at a start block 118 and then proceeds to a function block 120 to examine the video buffer 54. The program then flows to a decision block 122 to determine whether the program is still in the rental mode. If not, the program flows along a "N" path to a stop block 124. However, if the program is still in the rental mode, the program flows along a "Y" path from the decision block 122 to a function block 124 to open the captured file. The program then flows to a function block 126 to capture the date and time of rental from the video buffer 54 and then to a function block 128 to capture the tape ID. The program then flows to a function block 130 to capture the revenue information, and then to a function block 132 to close the captured file. The program then flows to a stop block 124.

It can be seen from the function blocks 124–132 that the video capture operation mainly looks at fields in the video buffer 54 during the operation of the revenue information capture program, which represents the function block 110 in the flowchart of FIG. 7. This information is merely extracted from the video buffer 54, stored in the capture file and then the program returned to await the next transaction.

In summary, there has been provided a revenue sharing system that utilizes a standard point of sale operating system and operates in the background with respect thereto. The data traffic created by the Point of Sale terminal during the processing of its operating program is examined and select data extracted therefrom. This select data is utilized to provide a parallel database of rental activity and revenue flow. This parallel database is forwarded to a revenue sharing center for processing.

Although the preferred embodiment has been described in detail, it should be understood that various changes, substitutions and alterations can be made therein without departing from the spirit and scope of the invention as defined by the appended claims.

What is claimed is:

1. A Point of Sale system for reporting selected, desirable portions of revenue transaction data relating to validated transactions that have occurred in the Point of Sale system, comprising:

a main storage device for storing data relating to received transactions;

an input device for receiving transaction input information regarding a revenue transaction;

a processor for receiving the transaction input information for processing thereof in accordance with a Point of Sale system operating program, said processor operable to generate the revenue transaction data and store the revenue transaction data in said storage device upon the occurrence of a predetermined transaction committal event;

a data traffic device for interfacing with said storage device, said processor and said input device to allow data flow therebetween;

a transaction detection device for detecting the occurrence of said predetermined transaction committal event, which committal event indicates the step of a user validating said transaction;

a data capture device for monitoring data traffic on said data traffic device and detecting the presence of the revenue transaction data generated by said processor and transferred thereto only when said transaction detection device detects the occurrence of said transaction committal event and capturing selected desirable portions of this detected revenue transaction data from said validated transactions; and a secondary storage device for storing the selected, desirable portions of said detected revenue transaction data that was captured by said data capture device from said validated transactions.

2. The system of claim 1, and further comprising:

a display interconnected with said data traffic device for displaying the revenue transaction data generated by said processor;

said data traffic device including a video buffer for buffering the information displayed onto said display, the revenue transaction data displayed on said display organized in fields; and said data capture device operable to select data corresponding to predetermined ones of said fields from said video buffer locating said fields according to predetermined memory addresses in said video buffer.

3. The system of claim 1, wherein said input device includes a keyboard for inputting keystrokes and said predetermined transaction committal event comprises a predetermined keystroke, said transaction detection device operable to detect the occurrence of said predetermined keystroke.

4. The system of claim 1, and further comprising an upload system connected to said secondary storage device for transferring said selected, desirable portions of said revenue transaction data from said validated transactions stored in said secondary storage device to a remote location.

5. The system of claim 1, wherein said transaction input information received from said input device includes a unique ID of an inventory item and said transaction data generated by said processor includes a corresponding unique ID and further comprising:

a translation device connected to said data capture device for storing a plurality of revenue sharing IDs in a lookup file, each corresponding with one of said unique IDs associated with an inventory item;

said translation device operable to translate said unique ID into a corresponding one of said revenue sharing IDs stored in said lookup table; and said revenue sharing ID associated with said transaction data stored in said secondary storage device by said data capture device.

6. A method for reporting selected desirable portions of revenue transaction data relating to the validated transactions that have occurred and sharing information from an operating system associated with a Point of Sale system to the revenue sharing parties, comprising the steps of:

providing a main storage device for storing the information relating to revenue transactions;

providing an input device for receiving transaction input information regarding a revenue transaction;

providing a processor for receiving the transaction input information from the input device for processing thereof in accordance with a Point of Sale system operating program;

interconnecting the storage device, processor and input device through a data traffic device to allow data flow therebetween;

inputting transaction input information into the input device;

processing the transaction input information received from the input device over the data traffic device with the processor to generate revenue transaction data;

storing the revenue transaction data in the main storage device upon a predetermined transaction committal event occurring;

providing a secondary storage device; and detecting the occurrence of the predetermined transaction committal event and thereby validating the transaction, then monitoring the data flow over the data traffic device and detecting predetermined transaction data flowing thereover and, only upon validation thereof, storing selected desirable portions of the detected predetermined transaction data from said validated transaction on the data traffic device in the secondary storage device.

7. The method of claim 6, and further comprising:

providing a keyboard for inputting keystrokes through the data traffic device to the processor;

wherein the predetermined transaction committal event comprises depression of a predetermined key to output a predetermined keystroke to the processor; and wherein the step of detecting the occurrence of the transaction committal event comprises detecting the occurrence of the predetermined keystroke on the data traffic device.

8. The method of claim 6, and further comprising:

providing a display;

interfacing the display with the data traffic device;

displaying the generated revenue transaction data on the display in a predetermined format;

providing a video capture buffer as part of the data traffic device;

storing the predetermined formatted revenue transaction data in the video buffer; and wherein the step of monitoring the data traffic to detect the desired transaction data comprises monitoring the contents of the video buffer to detect the presence of data at predetermined memory address locations therein, the predetermined format providing specific memory address transaction data at specific locations therein, this specific transaction data corresponding to the predetermined transaction data detected in the step of detecting.

9. The method of claim 6, and further comprising transferring the selected, desirable portions of the validated revenue transaction data stored in the secondary storage device to a remote billing location.

10. A Point of Sale system for reporting revenue transaction data relating to the transactions that have occurred in the Point of Sale system, comprising:

a main storage device for storing data relating to received transactions;

an input device for receiving transaction input information regarding a revenue transaction;

a processor for receiving the transaction input information for processing thereof in accordance with a Point of Sale system operating program, said processor operable to generate the revenue transaction data and store the revenue transaction data in said storage device upon the occurrence of a predetermined transaction completion event;

a display for displaying the revenue transaction data generated by said processor;

a data traffic device for interfacing with said storage device, said processor and said input device to allow data flow therebetween, said display interconnected with said data traffic device;

said data traffic device including a video buffer for buffering the information displayed onto said display, the revenue transaction data displayed on said display organized in fields;

a transaction detection device for detecting the occurrence of said predetermined transaction completion event;

a data capture device for monitoring data traffic on said data traffic device and detecting the presence of the revenue transaction data generated by said processor and transferred thereto when said transaction detection device detects the completion of said transaction completion event and capturing this detected revenue transaction data;

said data capture device operable to select data corresponding to predetermined ones of said fields from said video buffer locating said fields according to predetermined memory addresses in said video buffer; and a secondary storage device for storing the captured transaction data that was captured by said data capture device.

11. A method for reporting revenue sharing information from an operating system associated with a Point of Sale system to the revenue sharing parties, comprising the steps of:

providing a main storage device for storing information relating to revenue transactions;

providing an input device for receiving transaction input information regarding a revenue transaction;

providing a processor for receiving the transaction input information from the input device for processing thereof in accordance with a Point of Sale system operating program;

interconnecting the storage device, processor and input device through a data traffic device to allow data flow therebetween;

providing a display;

interfacing the display with the data traffic device;

inputting transaction input information into the input device;

processing the transaction input information received from the input device over the data traffic device with the processor to generate revenue transaction data;

displaying the generated revenue transaction data on the display in a predetermined format;

providing a video capture buffer as part of the data traffic device;

storing the revenue transaction data in the main storage device upon a predetermined transaction completion event occurring;

storing the predetermined formatted revenue transaction data in the video buffer;

providing a secondary storage device; and detecting the occurrence of the predetermined transaction completion event and, upon detection thereof, monitoring the data flow over the data traffic device and detecting predetermined transaction data flowing thereover, wherein the step of monitoring the data traffic to detect the desired transaction data comprises monitoring the contents of the video buffer to detect the presence of data at predetermined memory address locations therein, the predetermined format providing specific memory address transaction data at specific locations therein, this specific transaction data corresponding to the predetermined transaction data detected in the step of detecting and storing the detected predetermined transaction data on the data traffic device in the secondary storage device.

* * * * *